(12) United States Patent
Tanaka

(10) Patent No.: US 11,264,774 B2
(45) Date of Patent: Mar. 1, 2022

(54) LASER OSCILLATOR

(71) Applicant: FANUC CORPORATION, Yamanashi (JP)

(72) Inventor: Yasuyuki Tanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 53 days.

(21) Appl. No.: 17/009,019

(22) Filed: Sep. 1, 2020

(65) Prior Publication Data

US 2021/0111531 A1 Apr. 15, 2021

(30) Foreign Application Priority Data

Oct. 10, 2019 (JP) .............................. JP2019-186741

(51) Int. Cl.
*H01S 3/0941* (2006.01)
*H02M 1/42* (2007.01)
*H01S 3/094* (2006.01)
*H01S 3/067* (2006.01)
*H01S 3/091* (2006.01)

(52) U.S. Cl.
CPC .......... *H01S 3/0912* (2013.01); *H01S 3/0941* (2013.01); *H01S 3/094003* (2013.01); *H02M 1/4208* (2013.01); *H01S 3/067* (2013.01)

(58) Field of Classification Search
CPC .................................................... H01S 3/0912
See application file for complete search history.

(56) References Cited

U.S. PATENT DOCUMENTS

| 8,550,388 B2 * | 10/2013 | Donaldson | A47J 44/00 241/36 |
| 2002/0092802 A1 * | 7/2002 | Evana, III | B04B 15/02 210/143 |
| 2019/0260288 A1 * | 8/2019 | Nukui | H01S 3/1022 |

FOREIGN PATENT DOCUMENTS

JP 2017-103413 A 6/2017

\* cited by examiner

*Primary Examiner* — Tuan N Nguyen
(74) *Attorney, Agent, or Firm* — Studebaker & Brackett PC

(57) ABSTRACT

The present disclosure is intended to provide a smaller laser oscillator that can be manufactured at a reduced cost. Provided is a laser oscillator for producing a laser beam, the laser oscillator including: a housing; a transformer arranged in the housing, connected to a power supply, and supplying power to a first device that consumes a predetermined amount of power; and a power factor correction unit arranged in the housing, having a power factor correction circuit that brings a power factor close to 1, connected to the power supply, and supplying power to a second device that consumes a relatively larger amount of power than the first device.

3 Claims, 3 Drawing Sheets

LASER OSCILLATOR

This application is based on and claims the benefit of priority from Japanese Patent Application No. 2019-186741, filed on 10 Oct. 2019, the content of which is incorporated herein by reference.

BACKGROUND OF THE INVENTION

Field of the Invention

The present invention relates to a laser oscillator.

Related Art

Laser machines are conventionally known to machine a workpiece using a laser beam. The laser machine includes a laser oscillator for producing a laser beam to be applied to a workpiece. A related technique is disclosed in Patent Document 1, for example. Patent Document 1 discloses a laser oscillator that has a light emitter (cavity unit) for supplying excitation light and a power supply unit for supplying a current to the cavity unit and controlling light emission of a plurality of light-emitting elements.

Such a laser oscillator is supplied with a power supply voltage via a switchboard or the like, the power supply voltage varying from country to country due to power supply conditions. For example, the power supply voltage is 200 V in Japan, 400 V in Europe, 480 V in United States, and 380 V in China. To achieve adaptation to the power supply voltage of each country, a transformer that converts a voltage is employed.

Patent Document 1: Japanese Unexamined Patent Application, Publication. No. 2017-103413

SUMMARY OF THE INVENTION

The transformer is incorporated into, or provided separately from, the laser oscillator. To cause the laser oscillator to produce a laser beam at an increased output intensity, it is necessary to provide many transformers or a larger transformer. Although the transformer is comparatively inexpensive, incorporating a larger transformer or many transformers into the laser oscillator gives rise to a problem of the laser oscillator increasing in size.

The present invention is intended to achieve an object to provide a smaller laser oscillator that can be manufactured at a reduced cost.

An aspect of the present disclosure is directed to a laser oscillator for producing a laser beam, the laser oscillator including: a housing; a transformer arranged in the housing, connected to a power supply, and supplying power to a first device that consumes a predetermined amount of power; and a power factor correction unit arranged in the housing, having a power factor correction circuit that brings a power factor close to 1, connected to the power supply, and supplying power to a second device that consumes a relatively larger amount of power than the first device.

The aspect of the present disclosure provides a smaller laser oscillator that can be manufactured at a reduced cost.

DETAILED DESCRIPTION OF THE INVENTION

Figure 1:
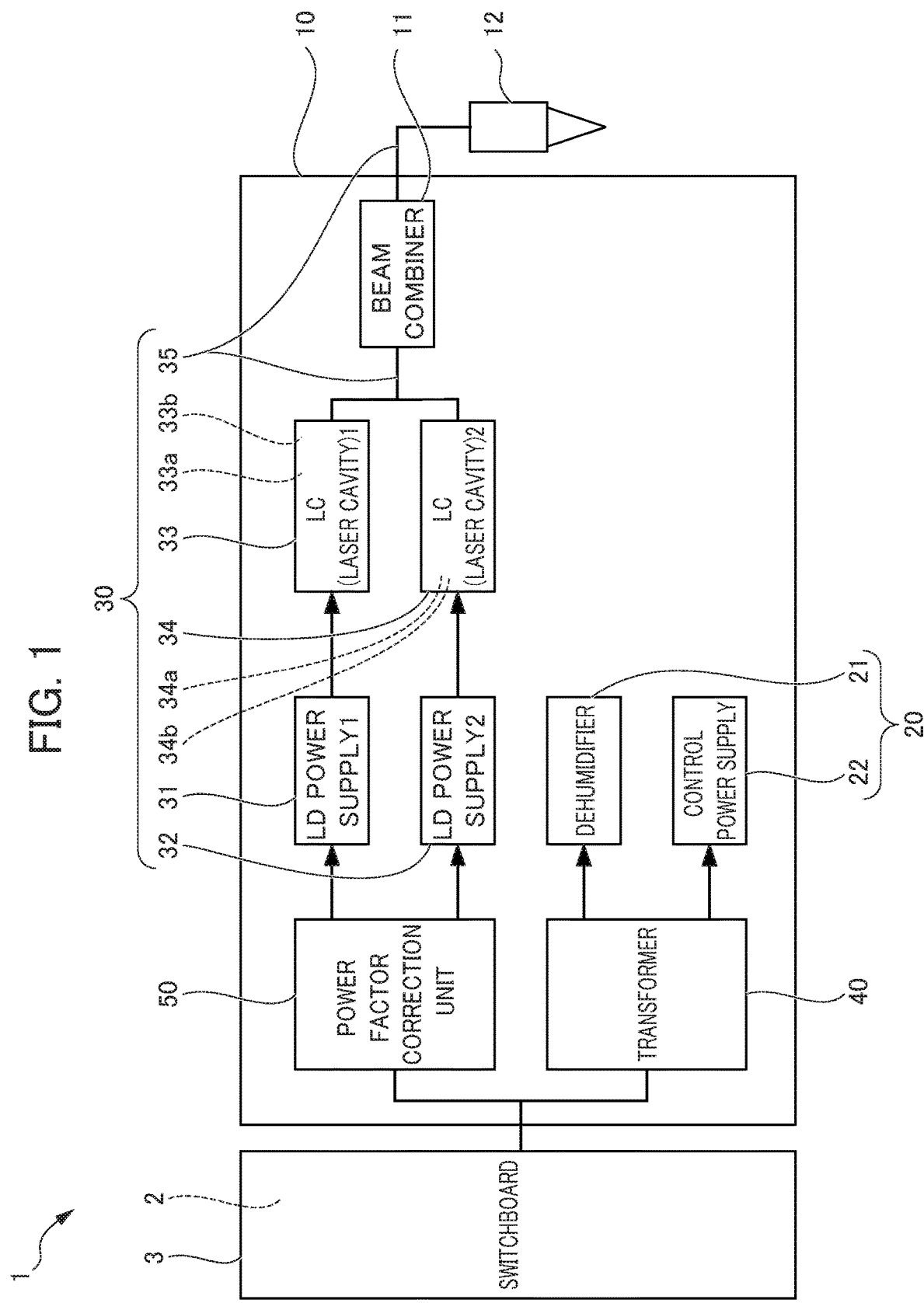
FIG. 1 is a block diagram showing an electric configuration of a laser oscillator according to an embodiment of the present invention.
Figure 2:
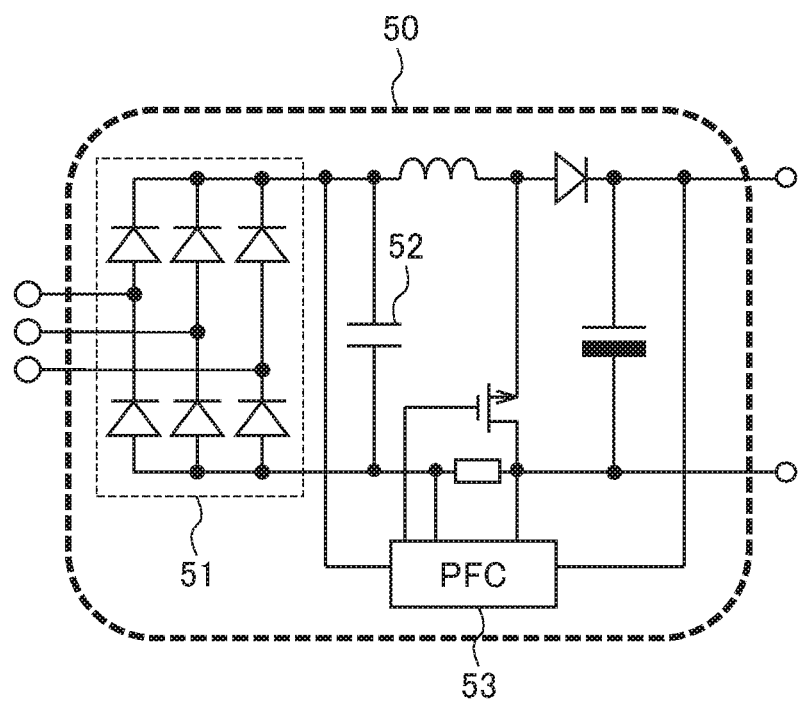
FIG. 2 is a schematic diagram showing a power factor correction unit of the laser oscillator according to the embodiment of the present invention.

An embodiment of the present invention will be described with reference to the accompanying drawings. FIG. 1 is a block diagram showing an electric configuration of a laser oscillator 1 according to the embodiment. FIG. 2 is a schematic diagram showing a power factor correction unit of the laser oscillator according to the embodiment.

As shown in FIG. 1, the laser oscillator 1 according to the embodiment includes: a housing 10; first devices 20 that consume a predetermined amount of power; second devices 30 that consume a larger amount of power than the first devices 20; a beam combiner 11; a laser machining head 12; a transformer 40; and the power factor correction unit 50. The laser oscillator 1 operates with power supplied via a switchboard 3 from a power supply 2 as an AC power supply, and applies a laser beam.

As shown FIG. 1, the housing 10 houses the first devices 20, the second devices 30, the beam combiner 11, the transformer 40, and the power factor correction unit 50.

The first devices 20 consume a relatively small amount of power, among the devices constituting the laser oscillator 1. The laser oscillator 1 includes, as the first devices 20, a dehumidifier 21 that performs a dehumidifying operation, a control power supply 22, a safety circuit 23, a contactor coil 24, a 24 V power supply unit 25, and a fan motor 26.

The second devices 30 consume a larger amount of power than the first devices 20. The second devices 30 mainly make a direct contribution to production of the laser beam, and include, for example, ID power supply units (laser diode power supply) 31, 32, laser cavity units 33, 34, laser diodes 33a, 34a included in the laser cavity units 33, 34, oscillation fibers 33b, 34b, and transmitting fibers 35.

The configuration of each of the second devices 30 will be described next.

The ID power supply units 31, 32 include a switching circuit (not shown), a smoothing circuit (not shown), a control circuit (not shown), and the like. The switching circuit has a switching transistor and a diode. The switching circuit turns on and off the switching transistor in response to a control signal from the control circuit, and generates a charge current in cooperation with the diode. The smoothing has an inductance element and a capacitance element. The smoothing circuit generates, from the charge current, a DC voltage across the ends of the capacitance element, and outputs the DC voltage to the laser cavity units 33, 34.

The laser cavity unit 33 has: the laser diode 33a that functions as a laser light source of the laser oscillator 1; and the oscillation fiber 33b, and produces a laser beam in accordance with a voltage supplied by the ID power supply unit 31. Specifically, when supplied with power from the ID power supply unit 31, the laser diode 33a causes excitation light to be incident on the oscillation fiber 33b.

The laser cavity unit 34 has: the laser diode 34a that functions as a laser light source of the laser oscillator 1; and the oscillation fiber 34b, and produces a laser beam in accordance with a voltage supplied by the ID power supply unit 32. Specifically, when supplied with power from the ID power supply unit 32, the laser diode 34a causes excitation light to be incident on the oscillation fiber 34b.

The transmitting fibers 35 connect each of the laser cavity units 33, 34 to the beam combiner 11, and the beam combiner 11 to the laser machining head 12, and propagate the laser light. The excitation light oscillated by the laser cavity units 33, 34 is propagated to the beam combiner 11 through the transmitting fibers 35.

The beam combiner 11 combines the laser beams produced by the laser cavity units 33, 34 with each other, and inputs the combined laser beam to the laser machining head 12. The laser machining head 12 applies the laser beam to a workpiece.

The transformer 40 will be described next. The transformer 40 is connected to the power supply 2 of the switchboard 3. The transformer 40 raises or lowers an AC voltage supplied from the power supply 2, and supplies the voltage to the first devices 20 that consume a small amount of power. Since the first devices 20 such as the dehumidifier 21 and the control power supply 22 consume a small amount power, a small transformer can be employed as the transformer 40. Thus, the transformer 40, which is small, is housed in the housing 10.

The power factor correction unit 50 will be described next. The power factor correction unit 50 is connected to the power supply 2 via the switchboard 3. The power factor correction unit 50 adjusts an AC voltage supplied from the power supply 2, and supplies power to the LD power supply units 31, 32 and the laser cavity units 33, 34 that are the second devices 30. The power factor correction unit 50 has a power factor correction circuit 53 and is housed in the housing 10. The power factor correction unit 50 according to the present embodiment is adaptable to different voltages within the range from AC 380 V to AC 480 V. The power factor correction unit 50 is also adaptable to a plurality of wire connection modes. For example, the power factor correction unit 50 is switchable from star connection to delta connection.

The power factor correction unit 50 is a rectifier circuit to which an AC voltage of a specific value can be inputted, which generates therein a DC voltage from the AC voltage, and which outputs the DC voltage. For example, as shown in FIG. 2, the power factor correction unit 50 has six diodes 51, a capacitance element 52, the power factor correction (PFC) circuit 53, and the like. The PFC circuit 53 brings a power factor close to 1. Since the power factor correction unit 50, excluding the PFC circuit 53, has the same configuration as that of a conventional rectifier circuit, detailed description thereof is omitted.

Figure 3:
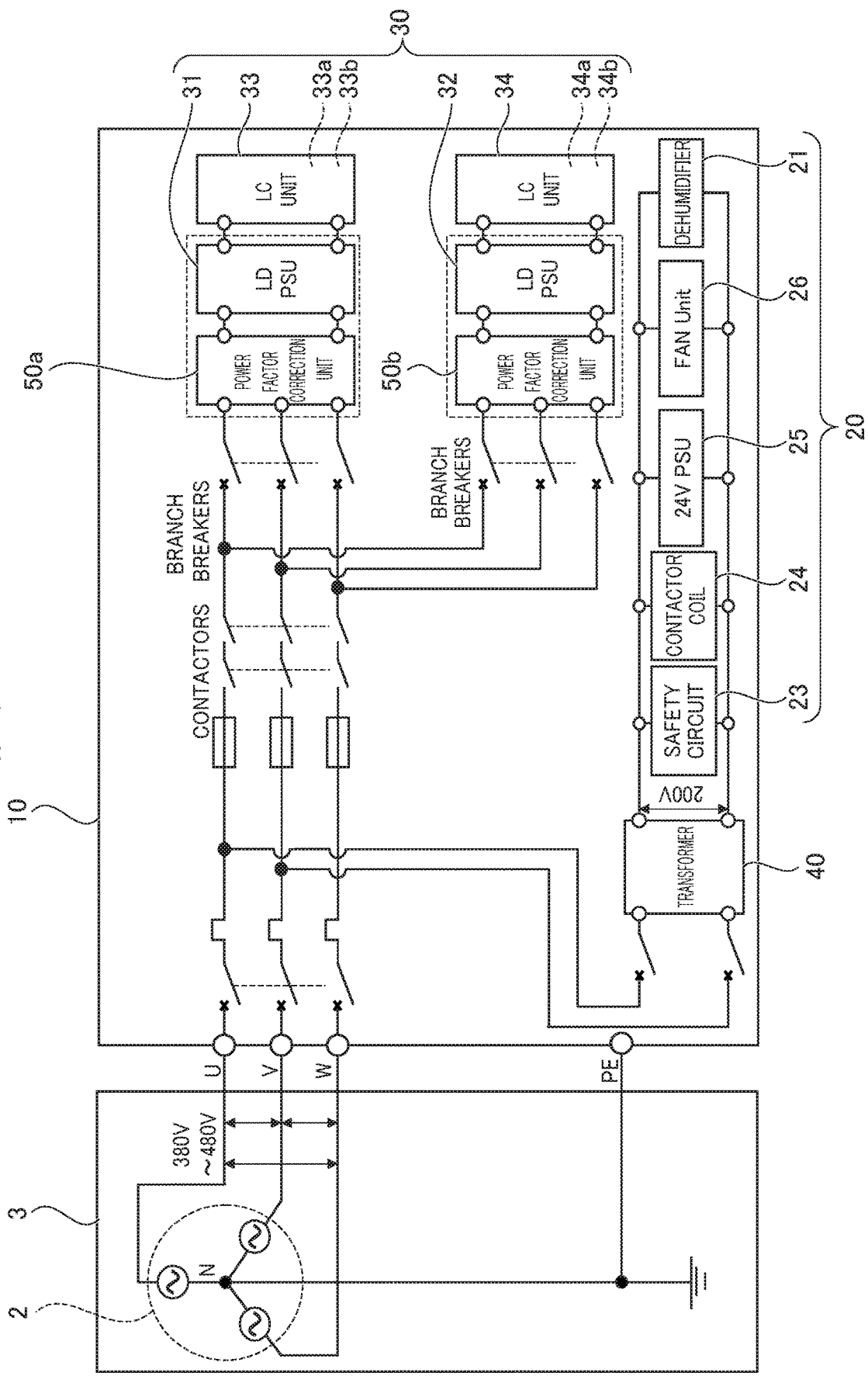
FIG. 3 is a schematic diagram showing an example of a specific configuration of the laser oscillator according to the embodiment of the present invention.

Next, a working example of the laser oscillator 1 according to an embodiment will be described. FIG. 3 is a schematic diagram showing an example of a specific configuration of the laser oscillator 1 of the embodiment, the laser oscillator 1 being connected to the switchboard 3. Note that the control power supply 22 and the beam combiner 11 are omitted from FIG. 3.

The power supply 2 as an electric power source of the laser oscillator 1 is a three-phase AC power supply having a power supply voltage ranging from AC 380 V to AC 480 V. The connection mode of the power supply 2 is star connection of a three-phase three-wire type. The power supply 2 has three cables of a U-phase, a V-phase, and a W-phase that are connected to the laser oscillator 1 via the switchboard 3, whereby the laser oscillator 1 is supplied with an AC voltage. The AC voltage enters the housing 10 through the U-phase, the V-phase, and the W-phase, and is supplied, as an input voltage of AC 380 V to AC 480 V, to the power factor correction unit 50 via contactors and branch breakers.

The power factor correction unit 50 provided in the laser oscillator 1 includes two units, namely, a first power factor correction unit 50a and a second power factor correction unit 50b. The first power factor correction unit 50a is connected to the LD power supply unit 31 and supplies a DC voltage to the LD power supply unit 31, while bringing a power factor close to 1. The second power factor correction unit 50b is connected to the LD power supply unit 32 and supplies a DC voltage to the LD power supply unit 32, while bringing a power factor close to 1.

The laser cavity unit 33 is supplied with a voltage of DC 380 V from the LD power supply unit 31. The laser diode 33a produces a laser beam, and causes excitation light to be incident on the oscillation fiber 33b. The laser cavity unit 34 is supplied with a voltage of DC 380 V from the LD power supply unit 32. The laser diode 34a produces a laser beam, and causes excitation light to be incident on the oscillation fiber 34b.

The transformer 40 is supplied with a single-phase AC voltage ranging from AC 380 V to AC 480 V, from the two cables of the U-phase and the V-phase of the power supply 2. The transformer 40 lowers the AC voltage ranging from AC 380 V to AC 480 V, to AC 200 V, and supplies the AC 200 V to the dehumidifier 21, the control power supply 22, the safety circuit 23, the contactor coil 24, the 24 V power supply unit 25, and the fan motor 26 that are located on a secondary side. According to the present embodiment, each of the first devices 20 can receive a voltage of AC 200 V of the same voltage specifications. As a result, the first devices 20 can be easily supplied with power, without using transformers 40 having different output voltages.

The above-described laser oscillator 1 according to the embodiment of the present disclosure exerts the following effects.

The laser oscillator 1 according to the embodiment of the present disclosure includes the transformer 40 and the power factor correction unit 50 that are housed in the housing 10, and uses the transformer 40 and the power factor correction unit 50 to supply the electrical power depending on the power consumption by the electrical devices included in the laser oscillator 1. This feature makes it possible to reduce the laser oscillator 1 in size, while reducing an increase in the manufacturing costs of the laser oscillator 1 as a whole unit.

Specifically, if power is supplied to the second devices 30 without using the power factor correction unit 50, due to the large amount of power consumed by the second devices 30, the capacitances of the electric devices (e.g., a power input unit) of the laser oscillator 1 increases. By contrast, in the laser oscillator 1 according to the present embodiment, the power factor correction unit 50 corrects the power factor such that a reactive current flowing to the LD power supply units 31, 32 decreases. As a result, power can be efficiently supplied to the second devices 30 that consume a large amount of power, whereby the laser oscillator 1 can be reduced in size. In addition, since the power factor correction unit 50 can be subjected to cooling, the power factor correction unit 50 can be designed to be smaller than the transformer 40 and to generate less heat. Therefore, the power factor correction unit 50 can be incorporated into the laser oscillator 1 that includes the housing 10 having a simple structure.

If the transformer 40 is used for the second devices 30 that consume a large amount of power, the large amount of power will be supplied by the transformer 40. As a result, the transformer 40 will need to have a large size and will generate much heat. In the laser oscillator L according to the present embodiment, the first devices 20 to which the transformer 40 supplies power consume a small amount of power. Therefore, the transformer 40 can be reduced in size and will generate less heat. Further, since the transformer 40 is less expensive than the power factor correction unit 50, configuring the laser oscillator 1 to use the transformer 40 and the power factor correction unit 50, to supply the electrical power depending on the power consumption of the electric devices of the laser oscillator 1 contributes to reduced manufacturing costs of the laser oscillator 1.

Furthermore, in the laser oscillator 1 according to the embodiment of the present disclosure, the power factor correction unit 50 is adaptable to different power supply voltages and different connection modes, while the first devices 20 supplied with power by the transformer 40 can receive voltages of the common voltage specifications. Thus, selecting the transformer 40 which is adapted to an input voltage supplied by the power supply 2 enables adaptation to the typical power supply voltage and connection mode of each country.

One embodiment of the present disclosure has been described in the foregoing. However, the present disclosure is not limited to the above-described embodiment, and modifications may be made to the present disclosure as appropriate.

According to the above-described embodiment, the first power factor correction unit 50a and the second power factor correction unit 50b are provided separately from the ID power supply units 31, 32, respectively. However, these units may be combined into a single unit. Specifically, the first power factor correction unit 50a may be incorporated into the ID power supply unit 31, and the second power factor correction unit 50b may be incorporated into the LD power supply unit 32.

According to the above-described embodiment, the voltages that can be inputted to the first devices 20 are of the same specifications. However, the voltages that can be inputted to the first devices 20 are not particularly limited, and may be different from each other.

EXPLANATION OF REFERENCE NUMERALS

1: Laser Oscillator
2: Power Supply
10: Housing
20: First Device
30: Second Device
40: Transformer
50: Power Factor Correction Unit
53: Power Factor Correction Circuit

What is claimed is:

1. A laser oscillator for producing a laser beam, the laser oscillator comprising:
   a housing;
   a transformer arranged in the housing, connected to a power supply, and supplying power to a first device that consumes a predetermined amount of power; and
   a power factor correction unit arranged in the housing, having a power factor correct on circuit that brings a power factor close to 1, connected to the power supply, and supplying power to a second device that consumes a relatively larger amount of power than the first device.

2. The laser oscillator according to claim 1, wherein the first device includes at least a dehumidifier, a control power supply, a safety circuit, a contactor coil, a 24 V power supply unit, or a fan motor.

3. The laser oscillator according to claim 1, wherein the second device includes at least an oscillation fiber, a laser diode that causes excitation light to be incident on the oscillation fiber, or a laser diode power supply that supplies power to the laser diode.

\* \* \* \* \*